United States Patent [19]

Ando

[11] Patent Number: 4,843,263
[45] Date of Patent: Jun. 27, 1989

[54] CLOCK TIMING CONTROLLER FOR A PLURALITY OF LSI CHIPS

[75] Inventor: Mitsugu Ando, Tokyo, Japan

[73] Assignee: NEC Corporation, Tokyo, Japan

[21] Appl. No.: 172,879

[22] Filed: Mar. 25, 1988

[30] Foreign Application Priority Data

Jan. 10, 1986 [JP] Japan .................................. 61-1975
Mar. 26, 1987 [JP] Japan ................................. 62-72809

[51] Int. Cl.$^4$ .......................... G06F 1/04; H03K 5/15
[52] U.S. Cl. .................................... 307/480; 307/269; 307/518; 328/75
[58] Field of Search ..................... 307/269, 480, 518; 328/72, 63, 152, 75

[56] References Cited

U.S. PATENT DOCUMENTS

| | | | |
|---|---|---|---|
| 4,137,563 | 1/1979 | Tsunuda .............................. | 307/269 |
| 4,613,775 | 9/1986 | Dick .................................... | 307/518 |
| 4,691,124 | 9/1987 | Ledzius et al. ..................... | 307/269 |

*Primary Examiner*—John S. Heyman
*Attorney, Agent, or Firm*—Sughrue, Mion, Zinn, Macpeak & Seas

[57] ABSTRACT

LSI chips are divided into a first chip and a plurality of second chips, and each of the first and second chips has a frequency divider for deriving a lower-frequency output clock signal from a higher-frequency input clock signal. A higher-frequency input clock signal is supplied to the first chip from an external clock source to produce a lower-frequency output clock signal. One of the second chips is selected by a chip selector and its clock output is applied to a phase comparator for comparison with the clock output of the first chip for generating a phase difference signal in response to a phase difference between the compared output clock signals. Gate circuits are enabled in the absence of the phase difference signal to supply the input clock signal to all of the second chips. The chip selector is shifted to the next one of the second chips in response to a chip selection signal in the absence of the phase difference signal. In the presence of a phase difference signal, one of the gate circuits which is associated with the selected chip is disabled to inhibit the application of the clock signal to the LSI chip in which synchronization slippage has occurred.

8 Claims, 4 Drawing Sheets

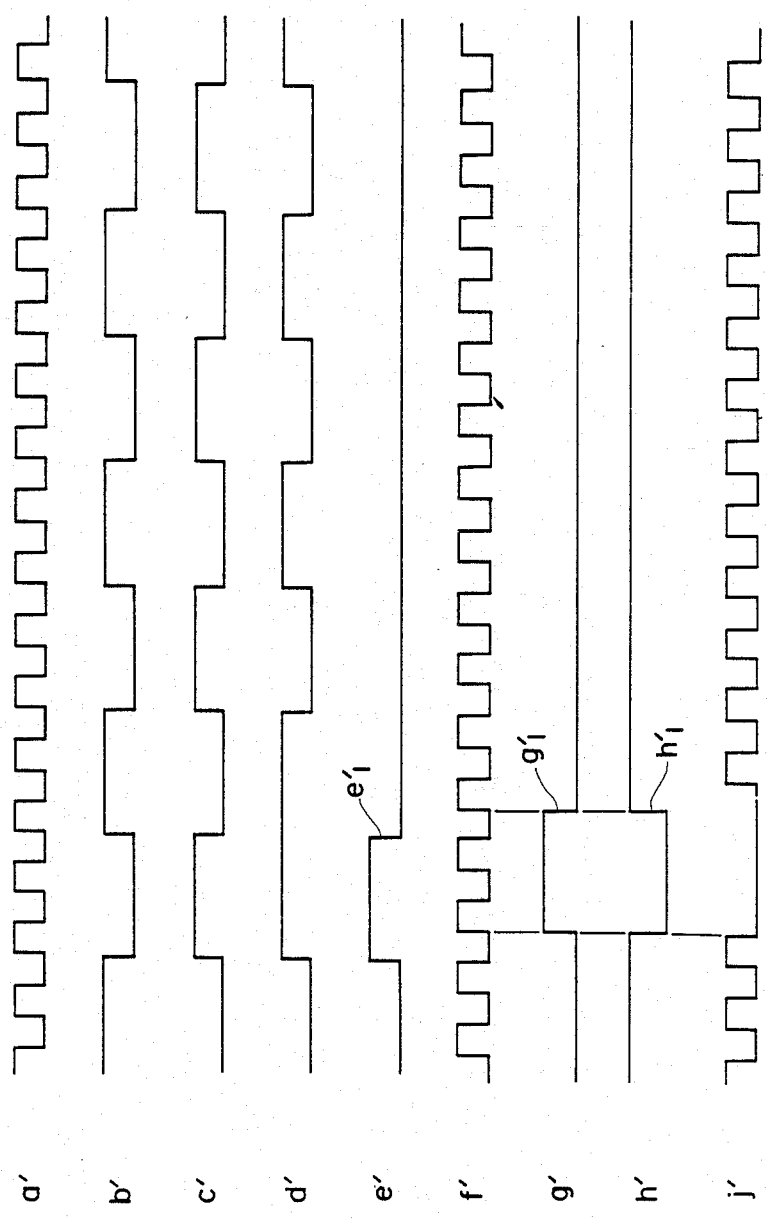

CLOCK TIMING CONTROLLER FOR A PLURALITY OF LSI CHIPS

BACKGROUND OF THE INVENTION

The present invention relates to a clock timing controller for operating a plurality of LSI (large-scale integration) chips.

Recent advances in semiconductor technologies have made possible the implementation of digital circuitry with LSI chips at modest costs. In a high-speed communications system, each LSI chip is so configured that it provides a particular single function and a plurality of LSI chips of different functions are combined to achieve an intended purpose. For example, digital satellite communications systems require highly sophisticated error coding techniques using high-speed, error coding and decoding circuits. These circuits are divided into functional blocks of different functions and implemented by different LSI chips. Since LSI chips are constructed of CMOS circuitry, they are operated in a parallel fashion to compensate for the inherent low-speed capability of the CMOS circuits. Although satisfactory parallel operation can be ensured if all the LSI chips are operated on a common clock source, synchronization slippage would occur between LSI chips if each LSI chip has a frequency divider to divide the frequency of the common clock signal for its own internal circuit.

SUMMARY OF THE INVENTION

It is therefore an object of the present invention to provide a clock timing controller for a plurality of integrated circuit chips which eliminates synchronization slippage.

According to the present invention, the integrated circuit chips are divided into a first chip and a plurality of second chips, and each of the first and second chips has a frequency divider for deriving a lower-frequency output clock signal from a higher-frequency input clock signal. A higher-frequency input clock signal is supplied to the first chip from an external clock source to produce a lower-frequency output clock signal. One of the second chips is selected by a chip selector and the output clock signal of the selected chip is applied to a phase comparator for comparison with the output clock signal of the first chip for generating a phase difference signal in response to a phase difference between the compared output clock signals. A plurality of gates, associated respectively with the second chips, have inputs connected to the external clock source and outputs connected respectively to inputs of the second chips. A gate control circuit is responsive to the phase comparator for enabling all of the gates in the absence of the phase difference signal to supply the higher-frequency input clock signal to all of the second chips and disabling the one of the gates which is associated with the selected chip in the presence of the phase difference signal. In the absence of the phase difference signal, the chip selector is shifted to the next one of the second chips in response to a chip selection signal supplied from a selector control circuit.

BRIEF DESCRIPTION OF THE DRAWINGS

The present invention will be described in further detail with reference to the accompanying drawings, in which:

FIG. 4 is a waveform diagram associated with the FIG. 3 embodiment.

DETAILED DESCRIPTION

Figure 1:
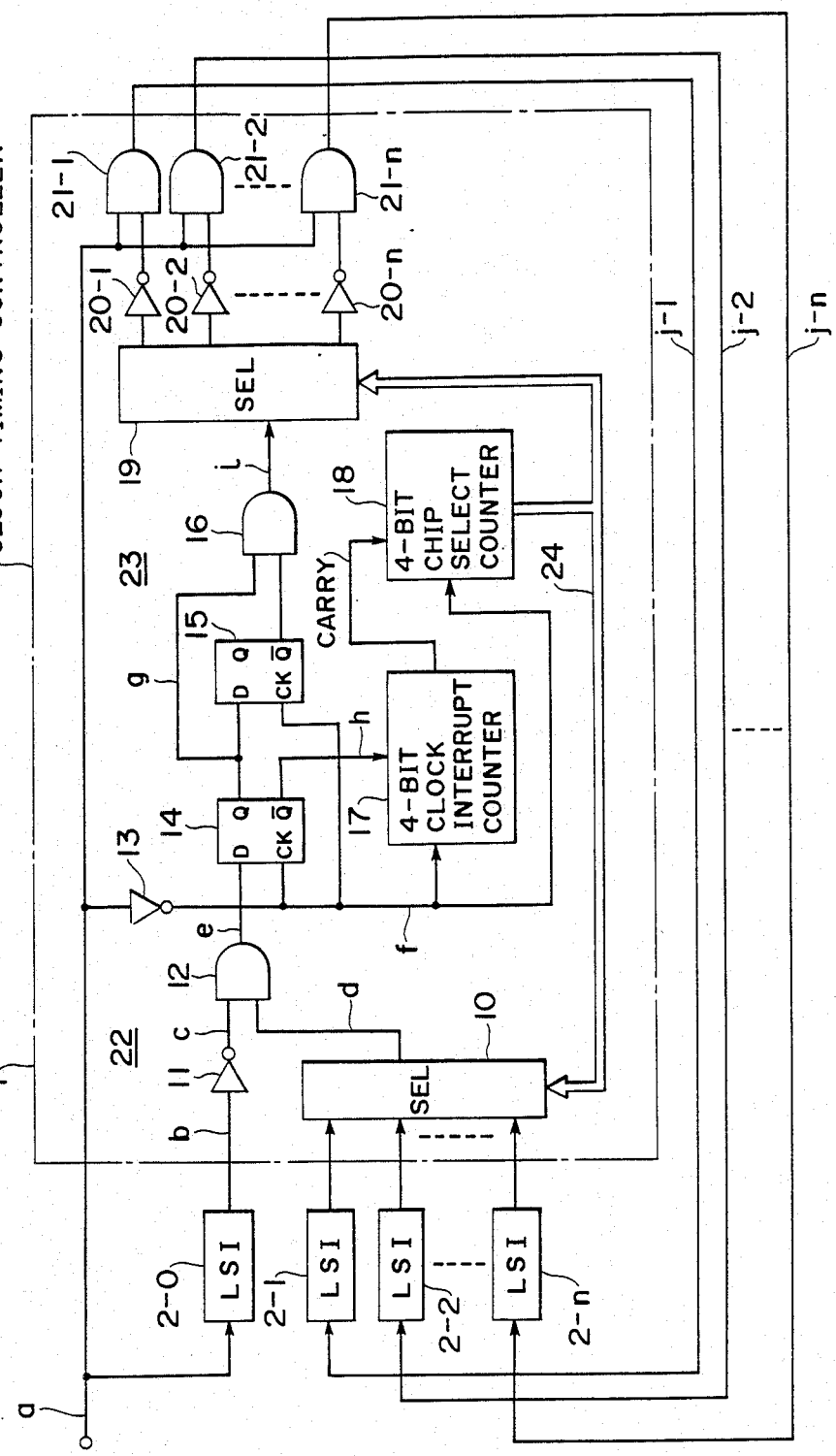
FIG. 1 is a block diagram of an embodiment of the present invention.

As represented in FIG. 1, a clock timing controller 1 is provided for a plurality of LSI (large-scale integration) chips 2-0 through 2-n. Each LSI chip includes a frequency divider for deriving a lower-frequency clock signal from an input clock signal. These clock signals are used in each LSI chip to drive its internal circuitry. The input clock signal a for LSI chip 2-0 is supplied from an external source, not shown, and input clock signals j-1 through j-n for LSI chips 2-1 through 2-n are supplied from the clock timing controller 1 which derives the clock signals j-1 through j-n from the input clock signal a and from clock signals from the outputs of LSI chips 2-1 through 2-n.

The clock timing controller 1 includes a phase comparator 22 formed by an inverter 11 and an AND gate 12. A clock signal b from the output of LSI chip 2-0 is passed through the inverter 11 and the output c of inverter 11 is applied to one input of the AND gate 12. The second input of AND gate 12 is connected from the output of a first chip selector 10 to which the outputs of LSI chips 2-1 through 2-n are connected. One of the outputs of LSI chips 2-1 through 2-n is selected in response to a 4-bit chip selection signal supplied on bus 24 from a 4-bit chip select counter 18 and applied as a clock input d for phase comparison by AND gate 12 with the clock signal b. A signal e representative of the difference in phase between clock pulse signals b and d is derived from AND gate 12 and supplied to the delay input of D flip-flop 14. The input clock pulse a is passed through an inverter 13 and applied as an inverted clock pulse f to the clock input of D flip-flops 14 and 15 and to the clock input of a 4-bit clock interrupt counter 17 and chip select counter 18. D flip-flop 14 has a true Q output which is coupled to the delay input of D flip-flop 15 and to one input of an AND gate 16. D flip-flop 15 and AND gate 16 constitute a one-shot multivibrator circuit 23 to generate a pulse i having a duration equal to the interval between the leading edges of successive clock pulses f, or twice the duration of a clock pulse. The output of AND gate 16 is applied to the data input port of a second chip selector 19 to which the chip selection signal is also supplied from the chip select counter 18. Second chip selector 19 has a plurality of output terminals which are respectively coupled through inverters 20-k (k=1, 2, . . . n) to AND gates 21-k for selectively gating the input clock pulse a via output lines j-k to the inputs of LSI chips 2-k. As will be described, when there is no phase difference between the clock pulses b and d, the logic level of input i to the chip selector 19 is at 0 and all the output terminals of chip selector 19 are brought to logic-0 states, which are inverted by inverters 20-k, enabling all the AND gates 20-m to pass the input clock pulse a to LSI chips 2-1 through 2-n. When phase difference occurs between the clock pulses b and d, the logic state of the input i switches to 1, and the one of the output terminals of chip selector 19 which is specified by the chip selection signal, switches to logic 1. This logic-1 state is inverted to logic 0, disabling the associated AND gate 21 to interrupt the application of the clock pulse a to the associated LSI chip.

The complementary Q output of flip-flop 14 is supplied as a reset pulse h to the reset port of the clock interrupt counter 17. In the absence of a reset pulse h, the clock interrupt counter 17 is continuously incremented in response to the clock pulse f and supplies a carry output to the chip select counter 18 when a full count is reached so that the chip selection signal is incremented at periodic intervals. Therefore, in the presence of a reset pulse h, the clock interrupt counter 17 is reset to zero and prevented from incrementing its count and hence the value of the chip selection signal remains unchanged.

Figure 2:
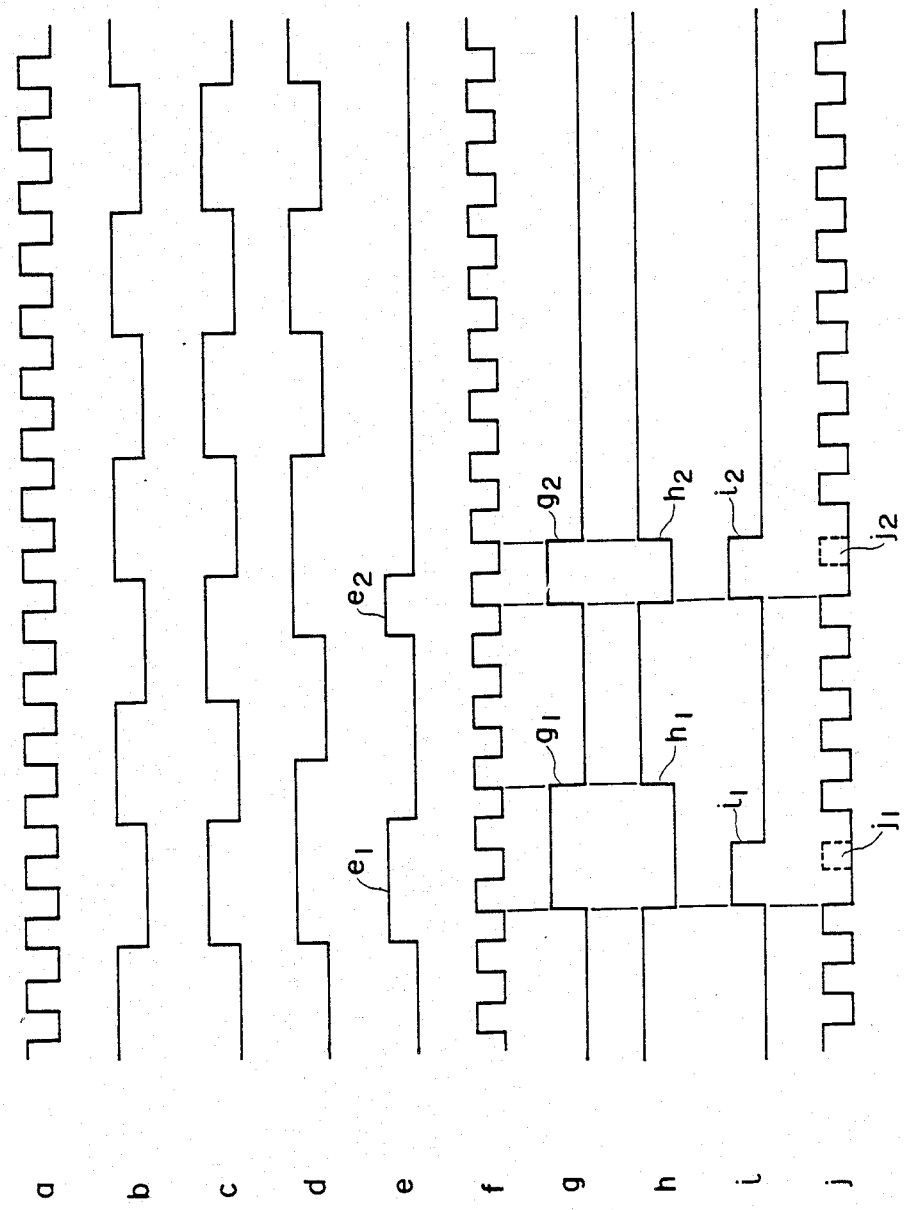
FIG. 2 is a waveform diagram associated with the FIG. 1 embodiment.

The present invention will be better understood with reference to FIG. 2 in which various waveforms are indicated by the same characters as those used to designate signals in FIG. 1. Assume that LSI chip 2-1 is being selected by chip selector 10. The frequency-divided clock pulse of LSI chip 2-1 is delivered as a pulse d to AND gate 12. If there is a phase match between pulses b and d, the logic level at the input i of chip selector 19 is 0 and AND gates 21 are all enabled, applying the input clock pulse a to LSI chips 2-1 through 2-n, and clock interrupt counter 17 is counting inverted clock pulses f. If phase difference occurs between pulses b and d, the output of AND gate 12 goes high, producing a positive-going pulse $e_1$. With the delay input of flip-flop 14 being switched to logic 1, the true output of flip-flop 14 switches to logic 1, producing a positive-going pulse $g_1$ and a negative-going pulse $h_1$, resetting clock interrupt counter 17. One-shot multivibrator 23 responds to pulse $g_1$ by presenting a constant-duration, positive-going pulse $i_1$ to the input of chip selector 19. In response to the logic-1 input to chip selector 19, the output of chip selector 19 to the inverter 20-1 switches to logic 1. Thus, AND gate 21-1 is disabled, removing a clock pulse $j_1$ from the pulse train j-1 to the LSI chip 2-1. If the phase difference still exists, a full count is not reached in the clock interrupt counter 17 and a second pulse $e_2$ will be generated, causing pulses $g_2$, $h_2$ and $i_2$ to be generated by the phase detector 22, removing a clock pulse $j_2$ from the pulse train j-1. The process is repeated until the timing of the clock output LSI chip 2-1 matches the timing of the clock output of LSI chip 2-0, whereupon a carry signal is supplied to the chip select counter 18 to shift the point of selection to the next LSI chip, i.e., LSI chip 2-2.

Figure 3:
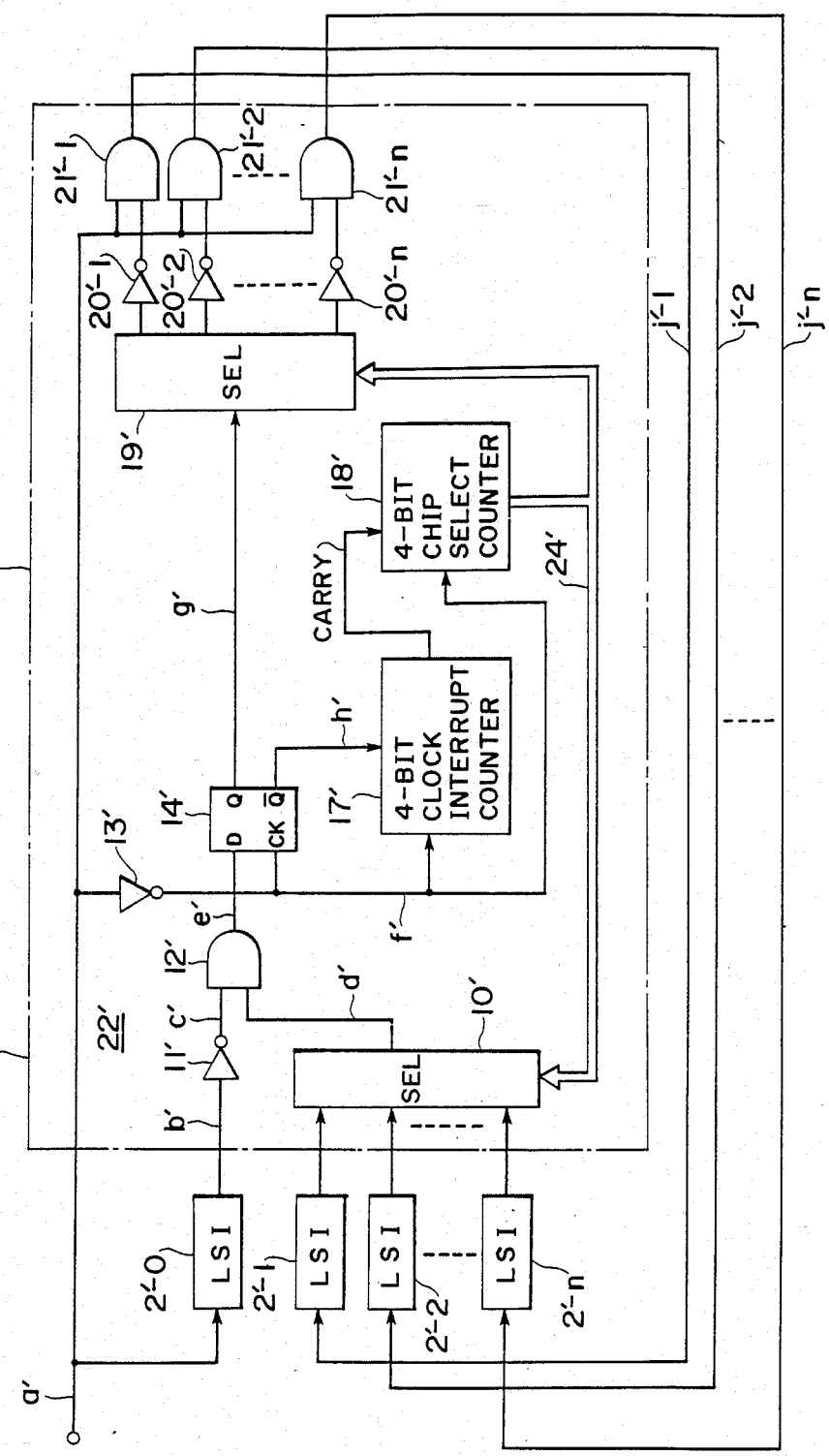
FIG. 3 is a block diagram of a simplified embodiment of the invention.

The embodiment of FIG. 1 can be simplified as shown in FIG. 3 in which parts corresponding to those in FIG. 1 are marked with primed numerals and characters. In FIG. 3, the one-shot multivibrator 23 of FIG. 1 is removed and the true output of D flip-flop 14 is directly connected to the chip selector 19' as an input g'. The operation of the FIG. 3 embodiment is as follows. If phase difference exists between clock pulses b' and d', AND gate 12' produces a pulse $e'_1$ (see FIG. 4) and the true output of flip-flop 14' goes high, producing a positive-going pulse $g'_1$ and the complementary output of this flip-flop goes low, producing a negative-going pulse $h'_1$ to reset the clock interrupt counter 17'. As long as the phase difference exists, the output of AND gate 12' is high, and the clock interrupt counter 17' is reset. The application of the logic-1 input to the chip selector 19' causes one of the inverters 20' to supply a logic-0 to the associated AND gate 21' to interrupt the application of clock pulses j' to the associated LSI chip.

The interruption of the clock pulses thus continues as long as a phase difference exists between pulses b' and d'.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A clock timing controller for a plurality of integrated circuit chips, each of said integrated circuit chips having a frequency divider for deriving a lower-frequency output clock signal from a higher-frequency input clock signal, wherein said integrated circuit chips are divided into a first chip and a plurality of second chips, comprising:

means for coupling a higher-frequency input clock signal from an external clock source to said first chip to produce a lower-frequency output clock signal therefrom;

chip selector means for selecting one of said second chips;

phase comparator means for comparing the output clock signal of said selected second chip with the output clock signal of said first chip for generating a phase difference signal in response to a phase difference between said compared output clock signals;

a plurality of gate means associated respectively with said second chips, said plurality of gate means having inputs connected to said external clock source and outputs connected respectively to inputs of said second chips;

gate control means responsive to said phase comparator means for enabling all of said gate means in the absence of said phase difference signal to supply said higher-frequency input clock signal to all of said second chips and disabling the one of said gate means which is associated with said selected second chip in the presence of said phase difference signal; and selector control means responsive to said phase comparator means for causing said chip selector means to sequentially shift to another of said second chips at periodic intervals in the absence of said phase difference signal.

2. A clock timing controller as claimed in claim 1, wherein said chip selector means comprises:

first selector means for selectively coupling the outputs of said second chips to said phase comparator means in response to a binary count;

second selector means for coupling an output of said phase comparator means to a selected one of a plurality of output terminals in response to said binary count; and a plurality of inverter means connected respectively to said output terminals for applying outputs of said inverter means respectively to said gate means, and wherein said selector control means comprises:

first counter means for continuously incrementing a count in the absence of said phase difference signal to generate a counter output when said count becomes full and resetting said count to zero in the presence of said phase difference signal; and second counter means for counting said first counter output to generate said binary count, said binary count being supplied to said first and second selector means.

3. A clock timing controller as claimed in claim 2, further comprising a flip-flop responsive to the output of said phase comparator means to produce a true and a complementary output, said true output being applied to said switch and said complementary output being applied for resetting the incremental count of said first counter means.

4. A clock timing controller as claimed in claim 2, further comprising a one-shot multivibrator connected between the true output of said flip-flop and an input of said second selector means.

5. A combination comprising:
a first integrated circuit chip having a frequency divider for deriving a lower-frequency output clock signal from a higher-frequency input clock signal supplied from an external clock source;
a plurality of second integrated circuit chips each having a frequency divider for deriving a lower-frequency output clock signal from said higher-frequency input clock signal;
chip selector means for selecting one of said second integrated circuit chips;
phase comparator means for comparing the output clock signal of said selected second integrated circuit chip with the output clock signal of said first integrated circuit chip for generating a phase difference signal in response to a phase difference between said compared output clock signals;
a plurality of gate means associated respectively with said second integrated circuit chips, said plurality of gate means having inputs connected to said external clock source and outputs connected respectively to inputs of said second integrated circuit chips;
gate control means responsive to said phase comparator means for enabling all of said gate means in the absence of said phase difference signal to supply said higher-frequency input clock signal to all of said second integrated circuit chips and disabling the one of said gate means which is associated with said selected second integrated circuit chip in the presence of said phase difference signal; and
selector control means responsive to said phase comparator means for causing said chip selector means to sequentially shift to another of said second integrated circuit chips at periodic intervals in the absence of said phase difference signal.

6. A combination as claimed in claim 5, wherein said chip selector means comprises:
first selector means for selectively coupling the outputs of said second integrated circuit chips to said phase comparator means in response to a binary count;
second selector means for coupling an output of said phase comparator means to a selected one of a plurality of output terminals in response to said binary count; and
a plurality of inverter means connected respectively to said output terminals for applying outputs of said inverter means respectively to said gate means, and wherein said selector control means comprises:
first counter means for continuously incrementing a count in the absence of said phase difference signal to generate a counter output when said count becomes full and resetting said count to zero in the presence of said phase difference signal; and
second counter means for counting said first counter output to generate said binary count, said binary count being supplied to said first and second selector means.

7. A combination as claimed in claim 6, further comprising a flip-flop responsive to the output of said phase comparator means to produce a true and a complementary output, said true output being applied to said switch and said complementary output being applied for resetting the incremental count of said first counter means.

8. A combination as claimed in claim 6, further comprising a one-shot multivibrator connected between the true output of said flip-flop and an input of said second selector means.

* * * * *